US012159053B1

(12) United States Patent
Ray et al.

(10) Patent No.: US 12,159,053 B1
(45) Date of Patent: Dec. 3, 2024

(54) SYSTEMS AND METHODS FOR IDENTIFYING COUNTERFEIT MEMORY

(71) Applicant: Board of Trustees for the University of Alabama, for and on behalf of the University of Alabama in Huntsville, Huntsville, AL (US)

(72) Inventors: Biswajit Ray, Madison, AL (US); Aleksandar Milenkovic, Madison, AL (US)

(73) Assignee: Board of Trustees for the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 17/877,023

(22) Filed: Jul. 29, 2022

Related U.S. Application Data

(63) Continuation-in-part of application No. 17/752,489, filed on May 24, 2022.

(60) Provisional application No. 63/192,412, filed on May 24, 2021.

(51) Int. Cl.
*G06F 3/06* (2006.01)

(52) U.S. Cl.
CPC .......... *G06F 3/0652* (2013.01); *G06F 3/0658* (2013.01); *G06F 3/0679* (2013.01); *G06F 3/0604* (2013.01)

(58) Field of Classification Search
CPC .... G06F 3/0604; G06F 3/0652; G06F 3/0658; G06F 3/0679
USPC ......................................................... 711/154
See application file for complete search history.

(56) References Cited

U.S. PATENT DOCUMENTS

| | | |
|---|---|---|
| 5,321,241 A | 6/1994 | Craine |
| 5,652,803 A | 7/1997 | Tachikawa et al. |
| 6,442,644 B1 | 8/2002 | Gustavson et al. |
| 6,659,353 B1 | 12/2003 | Okamoto et al. |

(Continued)

OTHER PUBLICATIONS

Clark, L. T. et al. Reliable techniques for integrated circuit identification and true random number generation using 1.5-transistor flash memory, Integration, vol. 65, 2019, pp. 263-272, https://doi.org/10.1016/j.vlsi.2017.10.001. (Year: 2019).*

(Continued)

*Primary Examiner* — Reginald G Bragdon
*Assistant Examiner* — Aaron D Ho
(74) *Attorney, Agent, or Firm* — Butler Snow LLP; Jon E. Holland

(57) ABSTRACT

A memory authentication system initiates various memory operations on a memory chip and then assesses the performance of the memory chip in performing such operations in an attempt to identify a signature in the chip's performance that can be used to identify the chip's source. As an example, a partial erase operation may be performed on programmed memory cells in order to drain some charge from the cells but allowing some charge to remain in the cells. Due to process variations during manufacturing, charge should drain from the cells at different rates such that some of the cells may flip to an erase state while other cells remain in a program state. The pattern of bit flips defines a unique signature that may be used to identify the chip's manufacturing source (e.g., the foundry at which the chip was manufactured).

7 Claims, 7 Drawing Sheets

(56) References Cited

U.S. PATENT DOCUMENTS

| | | | |
|---|---|---|---|
| 7,415,732 | B2 | 8/2008 | Montecalvo et al. |
| 7,491,948 | B2 | 2/2009 | Gordon et al. |
| 8,179,720 | B2 | 5/2012 | Fukuda et al. |
| 8,572,440 | B1 | 10/2013 | Nunally |
| 9,530,512 | B2 | 12/2016 | Ray et al. |
| 9,543,028 | B2 | 1/2017 | Ray et al. |
| 9,575,125 | B1 | 2/2017 | Andre et al. |
| 10,078,462 | B2* | 9/2018 | Wang ................. G06F 7/582 |
| 10,204,008 | B2 | 2/2019 | Trezise et al. |
| 10,223,199 | B2 | 3/2019 | Hahn et al. |
| 10,509,132 | B1 | 12/2019 | Ray et al. |
| 10,878,922 | B1 | 12/2020 | Ray |
| 10,956,557 | B2* | 3/2021 | Plusquellic ............ G06F 21/30 |
| 11,114,179 | B1 | 9/2021 | Ray et al. |
| 11,728,000 | B1 | 8/2023 | Ray et al. |
| 2004/0041197 | A1 | 3/2004 | Jong et al. |
| 2004/0191989 | A1 | 9/2004 | Ngo et al. |
| 2007/0043667 | A1 | 2/2007 | Qawami et al. |
| 2007/0079387 | A1 | 4/2007 | Ray et al. |
| 2008/0082872 | A1 | 4/2008 | Nagasaka et al. |
| 2009/0165086 | A1 | 6/2009 | Trichina et al. |
| 2010/0125765 | A1 | 5/2010 | Orbach et al. |
| 2010/0140488 | A1 | 6/2010 | Visconti et al. |
| 2011/0234241 | A1 | 9/2011 | Lewis et al. |
| 2012/0166814 | A1 | 6/2012 | Hayashi et al. |
| 2012/0233384 | A1* | 9/2012 | Charles ............ F15B 11/0365 |
| | | | 711/E12.008 |
| 2013/0019132 | A1 | 1/2013 | Amirkhanyan et al. |
| 2013/0127442 | A1 | 5/2013 | Satoh et al. |
| 2013/0176772 | A1 | 7/2013 | Deng et al. |
| 2013/0276151 | A1 | 10/2013 | Lewis et al. |
| 2014/0037086 | A1 | 2/2014 | Seol et al. |
| 2014/0075051 | A1 | 3/2014 | Zadesky et al. |
| 2014/0101063 | A1 | 4/2014 | Paul et al. |
| 2014/0143619 | A1 | 5/2014 | Gorman |
| 2014/0146607 | A1 | 5/2014 | Nagai et al. |
| 2015/0095550 | A1 | 4/2015 | Khan et al. |
| 2015/0169247 | A1 | 6/2015 | Wang et al. |
| 2015/0193204 | A1 | 7/2015 | Lin et al. |
| 2015/0268934 | A1 | 9/2015 | Anderson et al. |
| 2016/0034217 | A1 | 2/2016 | Kim et al. |
| 2016/0283629 | A1 | 9/2016 | Weckx et al. |
| 2017/0032843 | A1 | 2/2017 | Ilani et al. |
| 2017/0046129 | A1 | 2/2017 | Cambou |
| 2017/0090873 | A1 | 3/2017 | Clark et al. |
| 2017/0126229 | A1 | 5/2017 | Tan et al. |
| 2017/0269992 | A1 | 9/2017 | Bandic et al. |
| 2017/0323439 | A1* | 11/2017 | Sandberg ............... G06F 18/22 |
| 2018/0039484 | A1 | 2/2018 | La Fratta et al. |
| 2018/0122489 | A1* | 5/2018 | Ray ..................... G11C 16/28 |
| 2018/0129445 | A1* | 5/2018 | Shin .................. G06F 12/0246 |
| 2018/0158493 | A1 | 6/2018 | Ryu |
| 2018/0287793 | A1 | 10/2018 | Khatib Zadeh et al. |
| 2019/0096504 | A1 | 3/2019 | Revankar et al. |
| 2019/0294500 | A1 | 9/2019 | Hara et al. |
| 2019/0295963 | A1* | 9/2019 | Dekker ................. H01L 23/57 |
| 2020/0081689 | A1 | 3/2020 | Huang et al. |
| 2020/0135283 | A1* | 4/2020 | Park ..................... G06F 3/0604 |
| 2020/0204367 | A1 | 6/2020 | Miller et al. |
| 2020/0210098 | A1* | 7/2020 | Simionescu .......... G06F 3/0655 |
| 2020/0372967 | A1* | 11/2020 | Rahman ................... G11C 7/24 |
| 2021/0407602 | A1 | 12/2021 | Markov et al. |
| 2022/0050594 | A1* | 2/2022 | Kim ....................... G06F 3/064 |

OTHER PUBLICATIONS

Prabhu, P. et al. (2011). Extracting Device Fingerprints from Flash Memory by Exploiting Physical Variations. In: McCune, J.M., Balacheff, B., Perrig, A., Sadeghi, AR., Sasse, A., Beres, Y. (eds) Trust and Trustworthy Computing. Trust 2011. Lecture Notes in Computer Science, vol. 6740. Springer (Year: 2011).*

Jia, S., Xia, L., Wang, Z., Lin, J., Zhang, G., Ji, Y. (2015). Extracting Robust Keys from NAND Flash Physical Unclonable Functions. In: Lopez, J., Mitchell, C. (eds) Information Security. ISC 2015. Lecture Notes in Computer Science( ), vol. 9290. Springer, Cham. (Year: 2015).*

Prawar Poudel, Biswajit Ray, and Aleksandar Milenkovic. 2021. Microcontroller Fingerprinting Using Partially Erased NOR Flash Memory Cells. ACM Trans. Embed. Comput. Syst. 20, 3, Article 26 (May 2021), 23 pages. https://doi.org/10.1145/3448271 (Year: 2021).*

Y. Wang, W. -k. Yu, S. Wu, G. Malysa, G. E. Suh and E. C. Kan, "Flash Memory for Ubiquitous Hardware Security Functions: True Random Number Generation and Device Fingerprints," 2012 IEEE Symposium on Security and Privacy, San Francisco, CA, USA, 2012, pp. 33-47, doi: 10.1109/SP.2012.12. (Year: 2012).*

Zimu Guo, Xiaolin Xu, Mark M. Tehranipoor, and Domenic Forte. 2017. FFD: A Framework for Fake Flash Detection. In Proceedings of the 54th Annual Design Automation Conference 2017 (DAC '17). Association for Computing Machinery, New York, NY, USA, Article 8, 1-6 (Year: 2017).*

Sakib, Sadman, Preeti Kumari, B. M. S. Bahar Talukder, Md Tauhidur Rahman, and Biswajit Ray. 2018. "Non-Invasive Detection Method for Recycled Flash Memory Using Timing Characteristics †" Cryptography 2, No. 3: 17. https://doi.org/10.3390/cryptography2030017 (Year: 2018).*

B. M. S. Bahar Talukder, V. Menon, B. Ray, T. Neal and M. T. Rahman, "Towards the Avoidance of Counterfeit Memory: Identifying the DRAM Origin," 2020 IEEE International Symposium on Hardware Oriented Security and Trust (HOST), San Jose, CA, USA, 2020, pp. 111-121, doi: 10.1109/HOST45689.2020.9300125. (Year: 2020).*

Guin, et al., "Counterfeit Integrated Circuits: A Rising Threat in the Global Semiconductor Supply Chain," Proceedings of the IEEE, Aug. 2014, pp. 1207-1228, vol. 102, No. 8.

Guin, et al., "Counterfeit IC Detection and Challenges Ahead," Acm Sigda Newsletter, Jan. 2013, pp. 1-6.

Kumari, et al., Independent Detection of Recycled Flash Memory: Challenges and Solutions, IEEE, 2018, pp. 89-95.

Wang, et al., "Flash Memory for Ubiquitous Hardware Security Functions: True Random No. Generation and Device Fingerprints," 2012 IEEE Symposium on Security and Privacy, San Francisco, CA, 2012, pp. 33-47.

* cited by examiner

SYSTEMS AND METHODS FOR IDENTIFYING COUNTERFEIT MEMORY

CROSS REFERENCE TO RELATED APPLICATIONS

This application is a continuation-in-part of and claims priority to U.S. application Ser. No. 17/752,489, entitled "Systems and Methods for Identifying Counterfeit Memory" and filed on May 24, 2022, which is incorporated herein by reference. U.S. application Ser. No. 17/752,489 claims priority to U.S. Provisional Application No. 63/192,412, entitled "Flash-DNA: Identifying NAND Flash Memory Origins using Intrinsic Array Properties" and filed on May 27, 2021, which is incorporated herein by reference.

RELATED ART

Memory, an important element in electronic and computer applications, may include volatile and nonvolatile memory. Whereas volatile memory loses data stored in it with a loss of power, nonvolatile memory can preserve the data even after power cycling. Due to its widespread application, nonvolatile memory has become a target of counterfeiters and these counterfeit memory chips enter the market masquerading as new chips. Thus many memory chips have been found to be unreliable in their promised lifespan and efficiency. Counterfeit memory chips may result in failures of end-user applications, ranging from a loss of data and premature end-of-life to more serious catastrophic events.

NAND flash memory is generally a very popular commercial nonvolatile memory (NVM) option due to its high density (greater than 1 terabyte (TB)/square inch) along with its relatively low cost (less than \$1/gigabyte (GB)), lightweight and low power consumption, making it very attractive for a variety of electronic systems. However, NAND flash memory systems have a finite number of write cycles, after which they may become erratic and hence unreliable. Since a NAND flash memory can only go through a limited number of erase operations in its lifetime, identifying counterfeit NAND flash memory essentially means identifying the number of erase cycles that a given system has already gone through. Thus if a NAND flash memory that has gone through several erase cycles is sold as new, it may be not reliable for applications in mission-critical systems, medical systems or even consumer-level products which may require longer and robust lifecycles.

Some recently proposed techniques for counterfeit memory chip detection rely on physical and electrical inspections using high-tech imaging, parametric functionality tests, using ECIDs (Electronic Chip Identifiers), or Physical Unclonable Functions (PUFs). However, these methods have fallen short of widespread use due to high cost, requirement of large databases or reliance on experts, making authentication of memory chips a cumbersome and ineffective process. It is desirable and would be useful to provide a methodology for authenticating flash memory chips and other types of memory in an efficient, easy-to-use, cost-effective manner without the requirement of experts, so that it can be widely used in order to phase out the counterfeiting of memory chips.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for determining authenticity of memory. Counterfeit memory chips in the electronics supply chain of the market may be missed by existing methods for determining authenticity. For example, flash memory chips remain functional even after the end of the lifecycle of the product that housed the flash memory chips, providing opportunities for counterfeiters to retrieve the used flash memory chips and sell them as new. Although there exist many approaches for tracing the origins of flash memory chips, they can be easily circumvented by motivated counterfeiters. For example, the counterfeiters can emulate the exact features of the chip by erasing and re-programing the identity information of the manufacturer in a dedicated memory block of the chip.

In order to overcome this and several other shortcomings of the present approaches, some embodiments of the present disclosure employ techniques for detecting counterfeit memory by exploiting systematic variations in the properties of memory arrays that are fundamentally related to the specific manufacturing process. The systematic variations within the array are usually unique for a given family of memory chips as these variations originate from the unique nature of the underlying fabrication process (specifically, the foundry). In some embodiments, partial erase operations may be used to help in extracting variations in the physical properties among pages of a memory block, and these variations create a distinctive characterization that is unique for a given family of chips and differs significantly from erase characterizations observed in chips from other manufacturers.

In some embodiments of the present disclosure, a memory authentication system programs a plurality of cells (e.g., a memory block) in order to fill each of the cells with charge. A partial erase operation is then performed in order to drain charge from the cells. Such partial erase operation may be performed by initiating an erase operation and then terminating the erase operation before completion such that at least some charge remains in the cells. Due to process variations during manufacturing, charge should drain from the cells at different rates such that some of the cells may flip to an erase state (e.g., transition from "0" to "1") in response to the partial erase operation while other cells remain in a program state (e.g., "0") depending on the duration of the partial program operation (i.e., the amount of time from initiation of the erase operation to its termination). The pattern of bit flips defines a unique signature that may be used to identify the chip's source (e.g., the foundry at which the chip was manufactured). The system is configured to determine at least one parameter indicative of the signature and to provide information that may be used to authenticate the memory.

Figure 1:
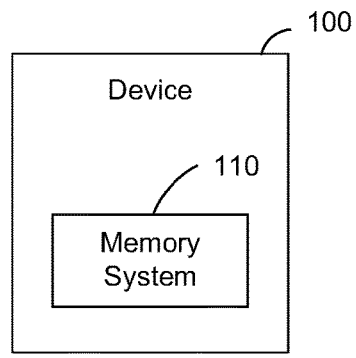
FIG. 1 is a block diagram illustrating an exemplary electronic device with memory.

FIG. 1 is a block diagram illustrating an exemplary electronic device 100 with a memory system 110 for storing data. The device 100 may include, but is not limited to, smartphones, mobile devices, tablets, personal digital assistants, personal computers, game consoles, game cartridges, or other devices, and the memory system 110 may be a memory card, a Universal Serial Bus flash drive, a solid-state drive, or other types of memory. In an exemplary embodiment, the memory system 110 may be a NAND flash architecture, although in other embodiments other types of devices 100 and other types of memory systems 110 are possible.

Figure 2:
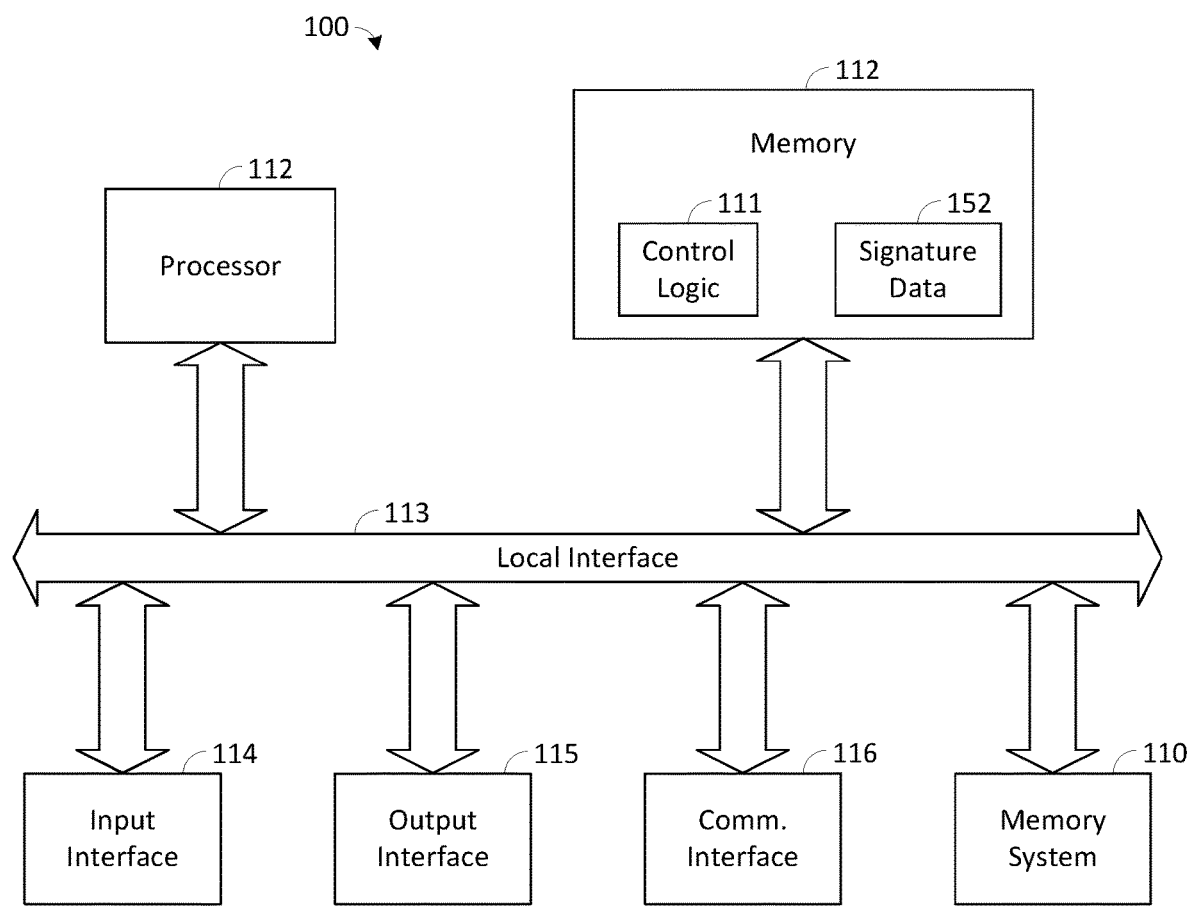
FIG. 2 is a block diagram illustrating an exemplary embodiment of an electronic device, such as is depicted by FIG. 1.

FIG. 2 depicts an exemplary embodiment of the electronic device 100. As shown by FIG. 2, the device 100 comprises control logic 111 for generally controlling the operation of the device 100, such as performance of memory authentication tests, as will be described in more detail hereafter. The control logic 111 can be implemented in software, hardware, firmware or any combination thereof. In the exemplary device 100 illustrated by FIG. 2, the control logic 111 is implemented in software and stored in memory 112 of the device 100.

Note that the control logic 111, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary device 100 depicted by FIG. 2 comprises at least one conventional processor 112, such as a digital signal processor (DSP) or a central processing unit (CPU), that communicates to and drives the other elements within the device 100 via a local interface 113, which can include at least one bus. As an example, the processor 112 may retrieve instructions stored in memory 112 and execute the instructions to perform the functionality described herein of the control logic 111. Furthermore, an input interface 114, for example, a keyboard or a mouse, can be used to input data from a user of the device 100, and an output interface 115, for example, a printer, monitor, liquid crystal display (LCD), or other display apparatus, can be used to output data to the user. In some embodiments, the input interface 114 and the output interface 115 may be integrated or otherwise share resources. As an example, the input interface 114 and the output interface 115 may be implemented as a touchscreen that is configured to display images and receive user input via capacitive sensing of touches of the touchscreen. Further, a communication interface 116, such as at least one modem, may be used to exchange data with an external device or system, such as a network. As an example, when the device 100 is implemented as a cellular telephone, the communication interface 116 may comprise a cellular transceiver for communicating with a cellular network. In some embodiments, data 152 referred to herein as "signature data" indicative of signatures that may be used to identify a source of at least one memory chip may be stored in memory 112 and used to authenticate memory chips according to techniques that will be described in more detail below.

It should be noted that different configurations of the device 100 are possible in other embodiments. As an example, it is possible for the control logic 111 to reside in the memory system 110 or at other locations. Using the embodiment shown by FIG. 2, it is possible to retrofit and existing device 100, such as an existing smartphone, with logic for performing authentication tests of memory by simply downloading instructions that define the control logic 111 into the device 100.

Figure 3:
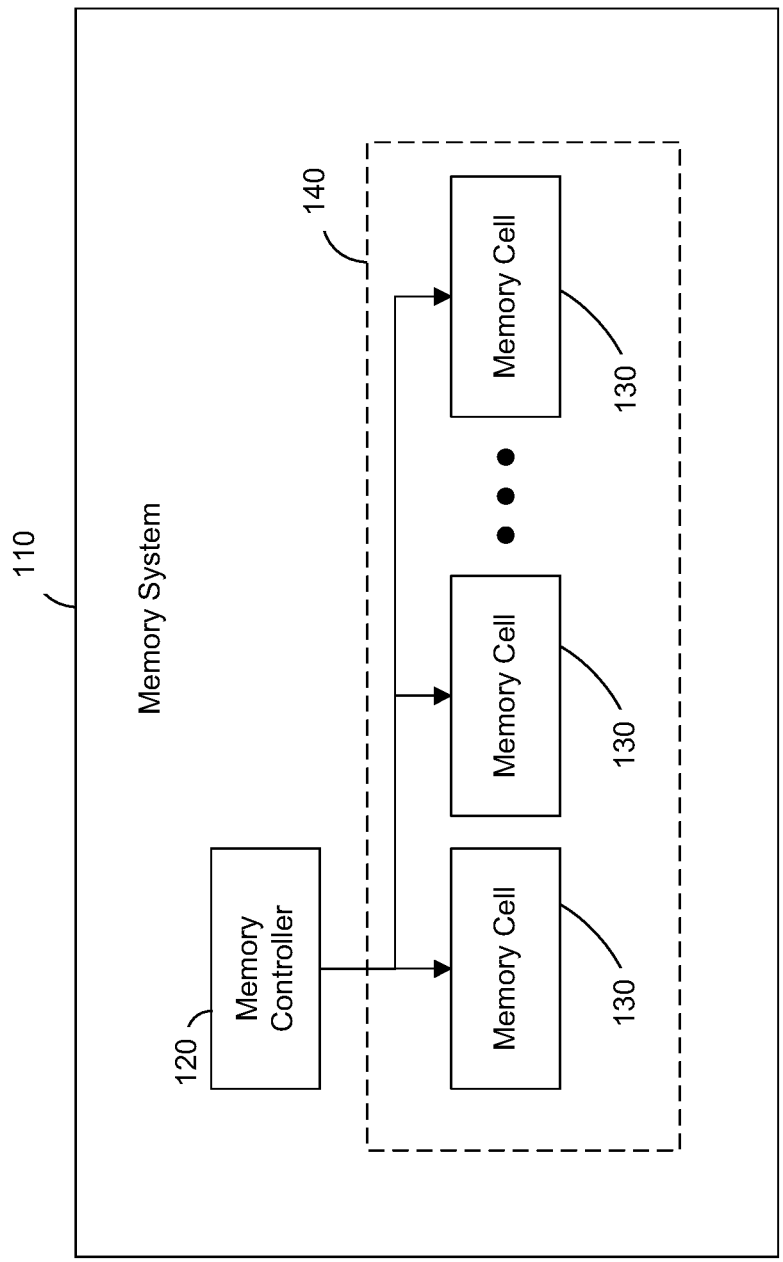
FIG. 3 is a block diagram illustrating an exemplary embodiment of a memory system.

FIG. 3 depicts a memory system 110 having a plurality of memory cells 130. Although a few memory cells 130 are shown only for illustration, the memory system 110 may have any number of memory cells 130 (from one to more than a trillion). The memory cells 130 may be flash memory configured as NOR, NAND, V-NAND or other types of arrangements. Unless otherwise indicated, it will be assumed that the memory cells 130 shown by FIG. 3 and described herein are NAND flash memory cells 130, but it should be emphasized that other types of memory cells 130 are possible (NOR flash, Resistive RAM, Ferroelectric RAM, etc.). In addition, each cell 130 of the memory system 110 may be configured for storing a desired number of charge states (bits) per cell, such as single level cell (SLC), multi-level cell (MLC), triple-level cell (TLC) or quad-level cell (QLC), etc.

Figure 5:
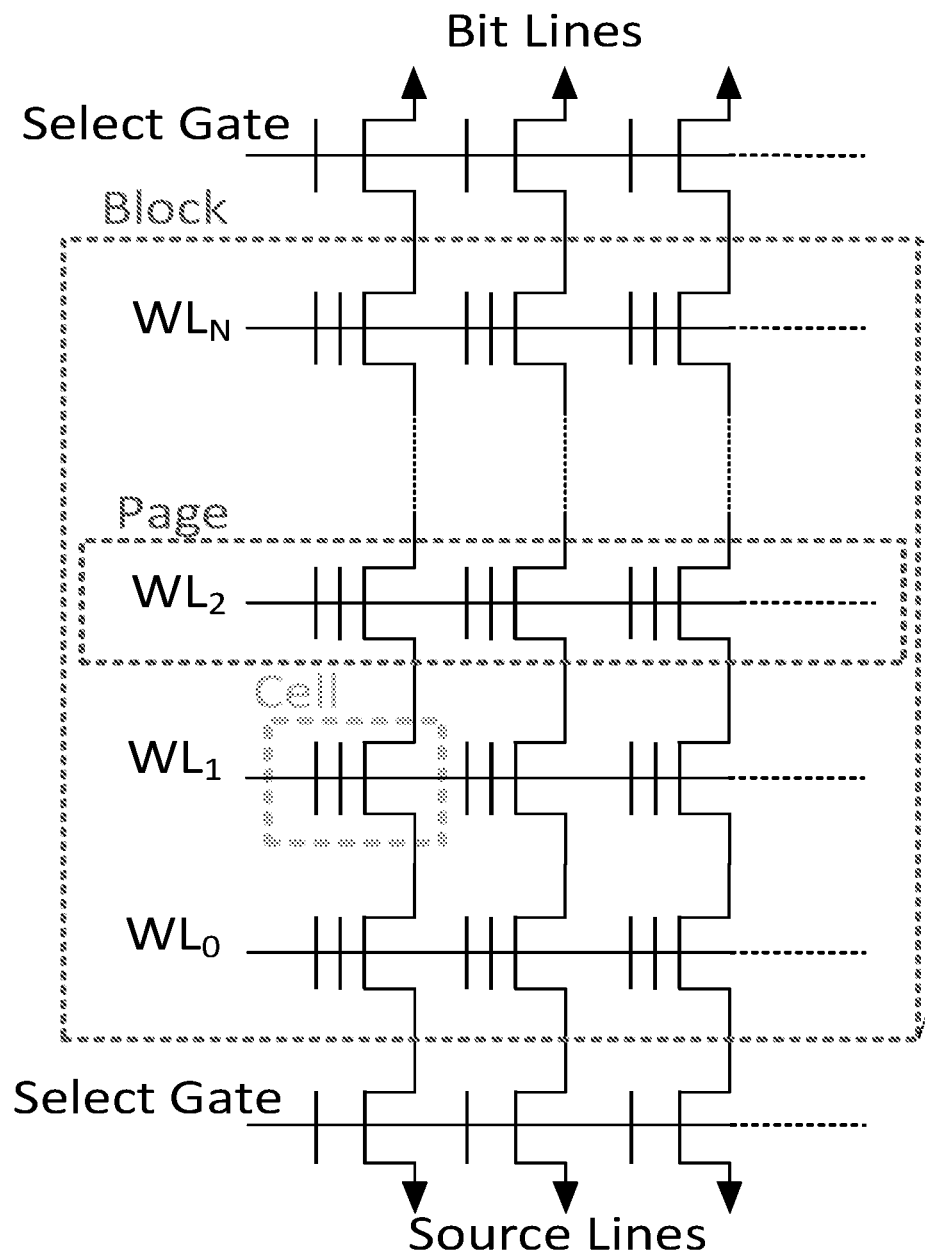
FIG. 5 is a circuit diagram illustrating an exemplary NAND flash memory array of a memory chip depicted in FIG. 3 using cells depicted in FIG. 4.

Memory cells 130 can be located on one or more memory chips 140. Within some classes of memory chips 140, memory cells 130 are setup in blocks 410 (FIG. 5) and pages 420 (FIG. 5). A page 420 represents the smallest unit that can be programmed to a memory chip 140. A block 410 represents the smallest unit that can be erased from a memory chip 140. In some embodiments, there are multiple pages 420 within each block 410. Note that, in the context of memory operations, the terms "program" and "write" are synonymous, and may be used interchangeably herein.

As shown by FIG. 3, memory cells 130 may be coupled to a memory controller 120 that is configured to perform memory operations, such as reading, erasing, and programming (writing) the memory cells 130 similar to other memory controllers known in the art. The memory controller 120 may be implemented in hardware or a combination of hardware and software. As an example, the memory controller 120 may be implemented exclusively in hardware, such as an ASIC, a field programmable gate array, or other type of circuitry configured to perform memory operations. In another example, the memory controller 120 may comprise at least one processor, such as digital signal processor (DSP) or central processing unit (CPU), that is configured to execute software to perform one or more functions of the memory controller 120. The memory controller 120 may also comprise a clock (not specifically shown) for enabling the memory controller 120 to track or otherwise determine time.

As known in the art, memory operations may be performed by applying specific voltages on connections or "lines," such as word lines and bit lines, connected to one or more memory cells 130 as appropriate for performing the desired operation. In some embodiments, memory cells 130 may be located on one or more memory chips 140 (an integrated circuit (IC) chip with memory), and the memory controller 120 may be on a separate IC chip that is electrically coupled to the memory chip 140. The memory controller 120 may transmit to a memory chip 140 a command to perform a memory operation, and the memory chip 140 may perform the commanded operation by applying voltages as appropriate to the memory cells 130 of the memory chip 140.

Figure 4:
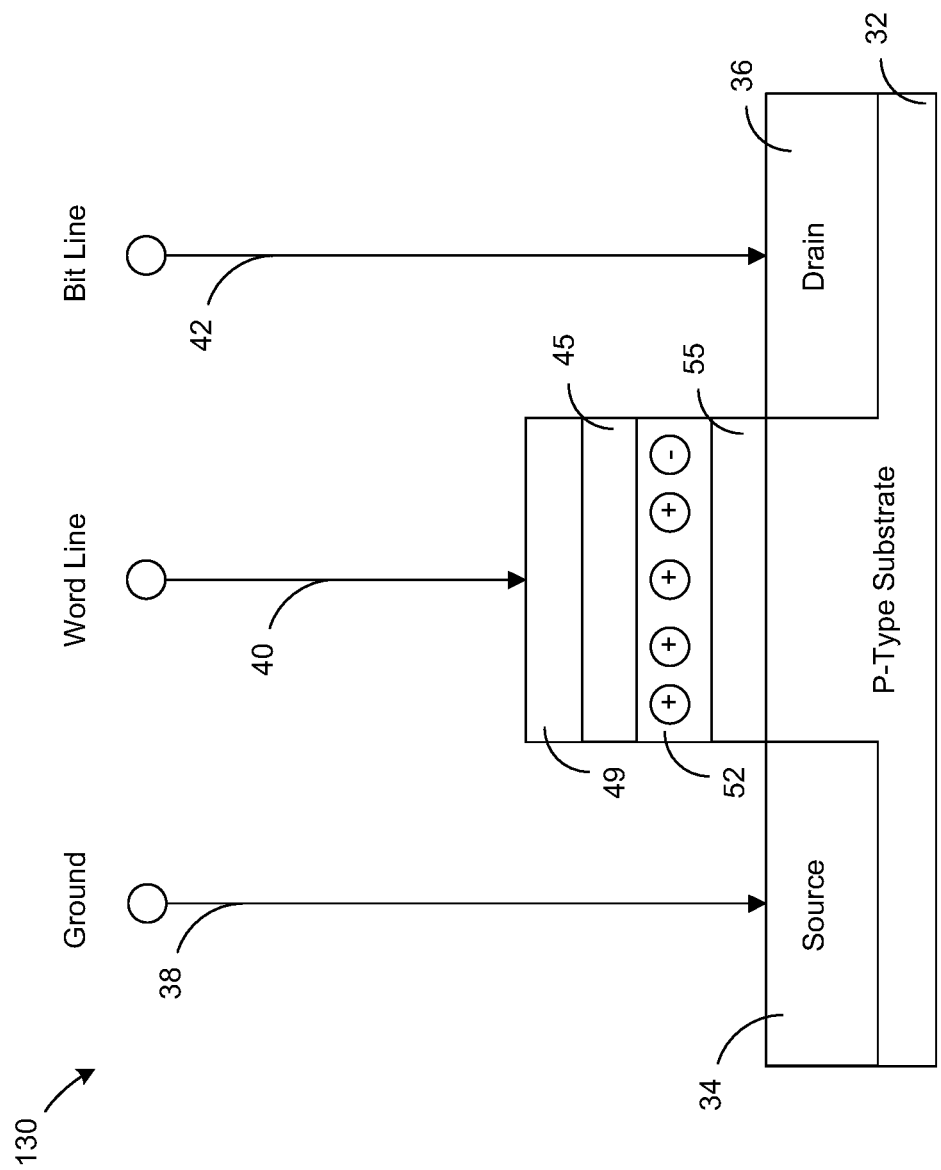
FIG. 4 is a block diagram illustrating an exemplary embodiment of a flash memory cell, such as is depicted by FIG. 3.

FIG. 4 depicts an exemplary embodiment of a flash memory cell 130, such as depicted by FIG. 3. The memory cell 130 is depicted as essentially a standard flash memory cell and has a substrate 32, source 34, drain 36, ground line 38, word line 40, and bit line 42. The memory cell 130 has a blocking oxide 45 below the control gate 49, and the memory cell 130 also has a tunnel oxide 55 below the floating gate 52. Flash memory is generally a type of non-volatile semiconductor memory that stores information in the form of charge on one or more floating gates 52. Voltage may be applied to the cell 130 via the lines 38, 40, 42 to perform read, erase, and program operations. Structurally, a flash memory cell 130 comprises a floating gate metal-oxide-semiconductor field effect transistor (FG-MOSFET), which allows electrons from the silicon substrate 32 to be tunneled into the floating gate 52 during the program operation (by applying a large positive charge differential across the control gate 49 and the substrate 32), thereby increasing the charge in the floating gate 52. The erase operation uses tunneling to remove electrons from the floating gate 52 to the substrate 32 (by applying a large negative charge differential across the control gate 49 and the substrate 32), thereby removing charge from the floating gate 52.

FIG. 5 depicts an exemplary NAND flash memory array of memory cells 130. Flash memory chips 140 are generally arranged in one or more blocks 410. Each block 410 generally contains one or more pages 420 (e.g., a block may contain 32, 64, 128, or some other number of pages). Each page 420 generally holds one or more memory cells 130 representing bits (e.g., a page may contain 512 to 16 K memory cells plus additional cells for error correction). The values stored in memory cells 130 are changed through operations generally referred to as erasing and programming.

The erase operation in NAND flash typically involves setting a high voltage on the substrate 32 and a low voltage on all the control gates 49 of the block 410 causing electron tunneling (removal of electrons) from the floating gate 52. An erase operation often forces the bit value in a memory cell 130 to a logical high value (a "1"). Performance of the erase operation typically erases each memory cell 130 of the block 410 being erased.

In a NAND flash memory system 110, an entire block 410 is typically erased before new data is written to any cell 130 within the block 410, noting that an individual flash cell cannot typically be erased or changed from a "0" to a "1" without so changing the other cells in the same block. In order to erase the block 410, a negative voltage is required to force electrons from the floating gate 52 as shown in FIG. 4. This may be accomplished by grounding the control gate 49 (e.g., applying 0V) and applying a voltage (e.g., 20V) to the substrate 32. As a result, electron tunneling takes place and electrons are removed from the floating gate 52.

Since the erase operation and the program operation are closely related, the endurance of a NAND flash memory system may according to the maximum tolerated number of program/erase cycles. With each program/erase cycle, more and more electrons are trapped in the blocking oxide layer 45. That is to say the operating window of threshold voltage ($V_{TH}$) gradually shrinks with each program/erase operation of a cell. The limit concerning the number of program/erase cycles is directly tied to the maker of the NAND flash memory system or model used (such as 100,000 cycles for an SLC, 10,000 for a two-level MLC and 5,000 for a TLC, etc.).

In FIG. 5, the NAND flash memory block 410 is organized as a two-dimensional array of memory cells 130, which, in a row, constitute a page 420 and their control gates are connected to a shared word line, depicted here as $WL_0$, $WL_1$ ... $WL_n$. As discussed previously, a flash memory chip often contains multiple blocks 410.

Some process variations at a foundry for manufacturing memory chips similarly affect all of the chips manufactured by the same foundry. These process variations result in performance variations across the surface of the chip according to a pattern that is similar for all chips manufactured by the same foundry. Thus, cells at the same chip location for different chips manufactured by the same foundry may exhibit similar performance, such as rates that charge is forced into or out of the cell by program or erase operations. That is, each chip from the same foundry exhibits a recognizable pattern in performance that can be exploited to identify the chip's manufacturing source (e.g., manufacturer or manufacturing foundry).

In some embodiments, the control logic 111 is configured to initiate various memory operations on a memory chip 140 and then assess the performance of the memory chip in performing such operations in an attempt to identify a signature in the chip's performance that can be used to identify the chip's source. This information may then be used to authenticate the chip 140 (e.g., determine whether the chip 140 is counterfeit).

There are various types of operations and techniques for assessing performance that can be used in an effort to identify a signature in the chip's performance. As will be described in more detail herein, a partial erase operation is used in some embodiments for this purpose. Such partial erase operation is advantageous to assess the chip's performance for several reasons, including the fact that according to existing architecture for many conventional memory chips, an erase operation can be uniformly performed across a large number of cells (e.g., a block) to facilitate identification of performance patterns across the cells. However, it should be emphasized that other types of memory operations may be used in other embodiments.

Initially, the control logic 111 is configured to select a range of memory in a memory chip 140 under test, including at least one memory block 410, for use in authenticating the chip 140, and instruct the memory controller 120 to perform an authentication test on the selected memory. As shown by block 510 of FIG. 6, the memory controller 120 is then configured to program each cell 130 of at least one block 410. As an example, for each page 420 of the block 410, the memory controller 120 may transmit to the memory chip 140 a command to program all 0's into each cell 130 of the page 420. In response, the memory chip 140 is configured to control the voltages applied to the cells 130 of the block 410 so that charge is sufficiently forced into each cell 130 to program the cell to a certain value (e.g., "0"), as shown by FIG. 7.

Figure 7:
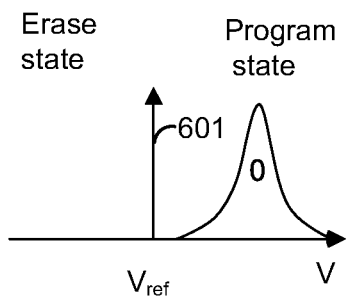
FIG. 7 is a graph illustrating page number versus erase efficiency for various partial erase times for a memory chip.

In this regard, FIG. 7 shows the voltage distribution of the cells 130 of the block 410 showing that each cell is in a program state, noting that reference arrow 601 represents the read threshold used to read values from the cells 130. Specifically, if the voltage of the charge within a given cell 130 exceeds the read threshold 601 during a read operation, then a certain value (e.g., "0") is read from the cell 130. However, if the voltage of the charge within the cell 130 is below the read threshold 601 during a read operation, then a different value (e.g., "1") is read from the cell. A cell 130 storing a voltage above the read threshold is generally referred to as being in the program state, and a cell 130 storing a voltage below the read threshold is generally referred to as being in the erase state.

Figure 6:
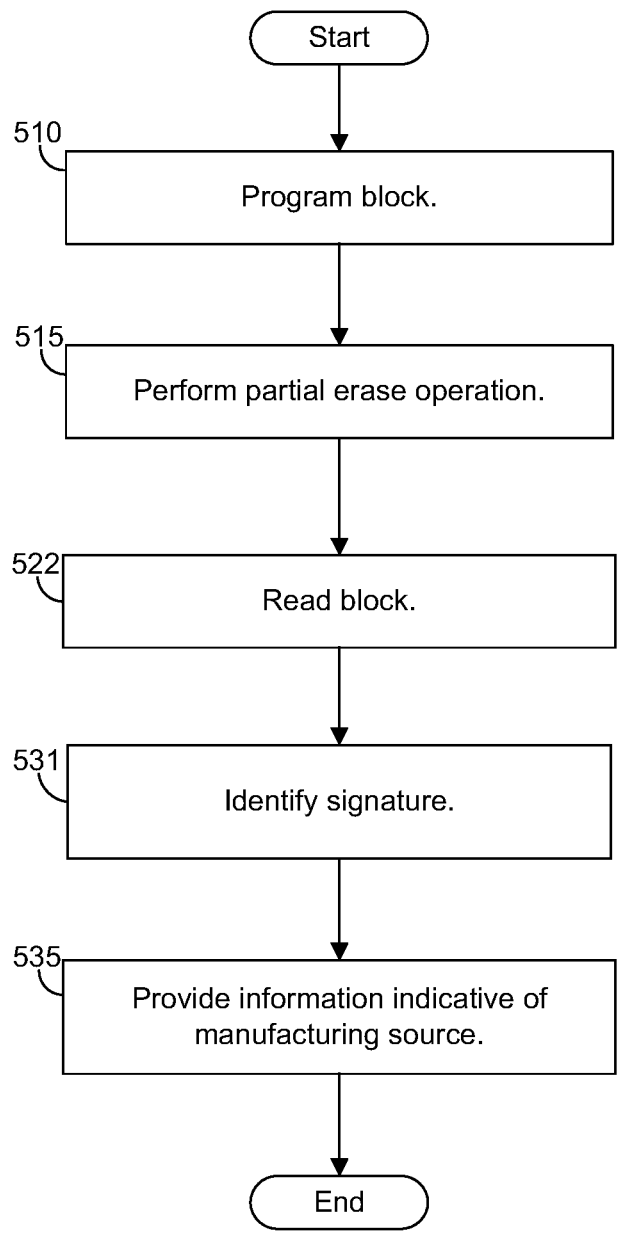
FIG. 6 is a graph illustrating voltages applied to a control gate of a memory cell for performing a partial erase operation.
Figure 8:
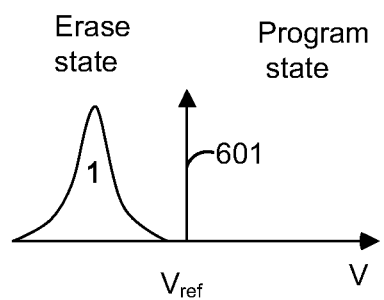
FIG. 8 is a block diagram illustrating an exemplary embodiment of circuitry within a memory chip, such as is depicted by FIG. 3.

After forcing all of the cells 130 of the block 410 to a program state in block 510, the memory controller 120 is configured to perform a partial erase operation, as shown by block 515 of FIG. 6. In some embodiments, this may be achieved by initiating an erase operation for the memory block 410. In this regard, the memory controller 120 may transmit to the memory chip 140 a command to erase the memory block 410. In response, the memory chip 140 is configured to control the voltages applied to the cells 130 of the block 410 so that charge is forced out of each cell 130. If the erase operation is permitted to run to completion, then each cell 130 would be transitioned to an erase state, as shown by FIG. 8. That is, charge would be sufficiently forced out of each cell 130 of the block 410 such that the voltage within each cell 130 would drop below the read threshold 601.

However, in the instant embodiment, rather than performing a normal erase operation, the memory controller 120 instead performs a partial erase operation so that the erase operation is terminated prematurely (i.e., before the erase operation is fully completed). In this regard, after transmitting the erase command in block 515 to initiate an erase operation, the memory controller 120 waits for a specified amount of time (which is shorter than the time required to perform a normal erase operation) and then transmits to the memory chip 140 a command (e.g., an interrupt signal) that causes the memory chip 140 to terminate the erase operation being performed.

Figure 9:
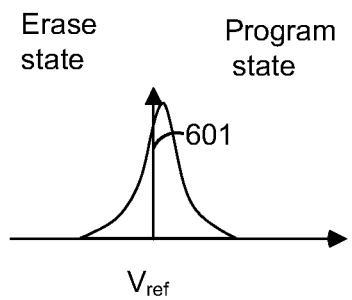
FIG. 9 is flowchart illustrating an exemplary partial erase operation of a flash memory, such as is depicted by FIG. 5.

After termination of the erase operation, some charge has been forced out of the memory cells 130 of the block 410, but some charge also remains in each cell 130, as shown by FIG. 9. Preferably, the timing of the partial program operation is controlled via the timing of the interrupt such that some of the cells 130 have transitioned to the erase state while some of the cells 130 remain in the program state, as shown by FIG. 9. Such a state for the cells 130 involved in the partial erase operation shall be referred herein as a "partially-erased state." Which cells 130 transition to the program state is a function of the duration of the partial erase operation and the process variations of the chip 140. That is, the process variations cause different cell performance during the partial program operation such that some of the cells 130 transfer charge at a different rate than other cells 130 such that the voltages in the cells 130 pass the read threshold 601 at different times. However, as noted above, these process variations tend to be similar for the chips manufactured by the same foundry such that the pattern of cells 130 that transition to the erase state for the same approximate duration of the partial erase operation is similar for chips 140 manufactured by the same foundry.

After the partial erase has been performed, the memory controller 120 is configured to read the entire block 410, as shown by block 522 of FIG. 6. As an example, the memory controller 120 may transmit a read command for each page 420 of the block 410. In response, the memory chip 140 is configured to return to the memory controller 120 the value stored in each cell 130 of the block. The memory controller 120 is configured to provide the read data tot the control logic 111, which is configured to then compare the read values to the predefined signature data 152 indicative of signatures for chips of different sources to identify a signature of the read values, as shown by block 531 of FIG. 6. In this regard, the control logic 111 is configured to determine if the pattern of the cell values read for the chip 140 under test matches any of the signatures indicated by the data 152. If so, the memory controller 120 determines that the chip 140 under test is from the manufacturing source associated with the matched signature.

In some embodiments, to facilitate comparison with the signature data 152, the control logic 111 is configured to calculate certain parameters that may be compared to parameters indicated by the signature data 152. As an example, for each page 420, the memory controller 120 may be configured to determine a value, referred to herein as "erase efficiency" of the page 420. The erase efficiency generally refers to the percentage of cells 130 that have transitioned to the erase state. It may be calculated by counting the number of cells storing a value associated with the erase state (e.g., a "1") and dividing that number by the total number of cells 130 of the page 420. In other embodiments, it is possible to calculate other types of values that indicate the erase efficiency. In general, for the same duration of partial program operation, it is expected that the same page in multiple chips manufactured by the same foundry should have about the same erase efficiency. Thus, in some embodiments, the values read in block 525 may be deemed to match a particular signature when the pattern of erase efficiencies across the pages 420 under test sufficiently match the pattern of erase efficiencies associated with the particular signature.

Figure 10A:
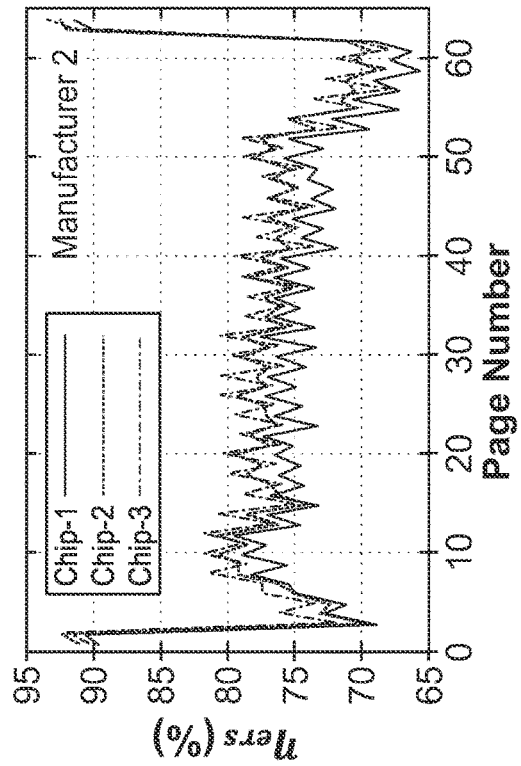
FIG. 10A illustrates an exemplary graph of erase efficiency for three memory chips from a first source.
Figure 10B:
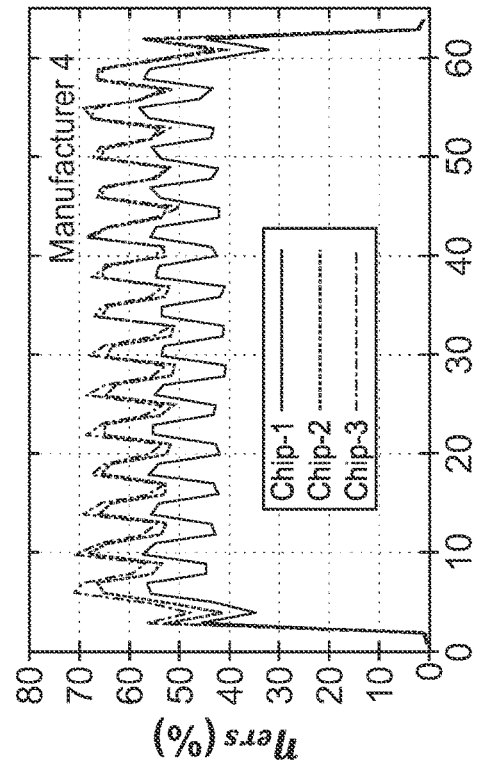
FIG. 10B illustrates an exemplary graph of erase efficiency for three memory chips from a second source.
Figure 10C:
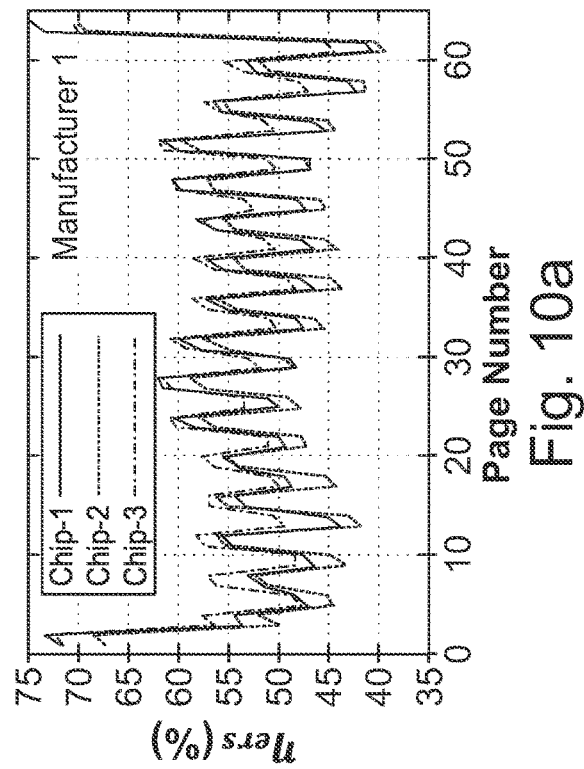
FIG. 10C illustrates an exemplary graph of erase efficiency for three memory chips from a third source.
Figure 10D:
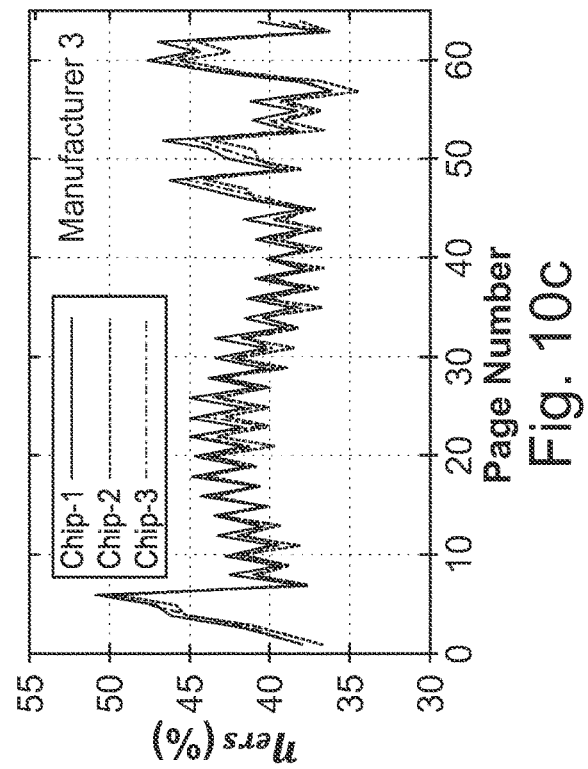
FIG. 10D illustrates an exemplary graph of erase efficiency for three memory chips from a fourth source.

FIGS. 10A-D shows the graphs of erase efficiency across various pages for chips from different manufacturers. In this regard, FIG. 10A shows the graphs of erase efficiency for three chips from a first source, FIG. 10B shows the graphs of erase efficiency for three chips from a second source, FIG. 10C shows the graphs of erase efficiency for three chips from a third source, and FIG. 10D shows the graphs of erase efficiency for three chips from a fourth source. As shown by the graphs of FIGS. 10A-D, the chips from the same source exhibit a similar pattern of erase efficiency. In some embodiments, for each source, the signature data 152 may store data indicating the erase efficiency across the pages 420 of a block 410 from the source. Thus, if the pattern of erase efficiency from the chip 140 under test substantially matches one of the predefined signatures, then the chip 140 may be authenticated as having been manufactured by the source associated with the matching signature.

Referring to block 535 of FIG. 6, after assessing the data read from the chip 140 under test in block 531, the control logic 111 is configured provide information indicative of the chip's source. As an example, if the control logic 111 has identified the chip's source, the control logic 111 may provide (e.g., display via the output interface 115 or otherwise) the name or other identifier of the source. In other embodiments, the memory control logic 111 may provide (e.g., display via the output interface 115 or otherwise) information about the read values, such as a plot of the values or the erase efficiencies of the pages calculated from the values, and a user may then assess the chip's source based on such information. In some embodiments, a user may provide an input identifying a certain source, and the control logic 111 may provide feedback indicating whether the chip 140 is authenticated as originating from such source. Various other types of information may be provided by the control logic 111 in other embodiments.

Note that the techniques described above may be performed on any number of blocks 410 within the chip 140 under test. In general, performing tests on a larger number of blocks 410 increases the amount of data that may be compared to the signature data 152 thereby facilitating identification of a matching signature.

What is claimed is:

1. An electronic device, comprising:
    memory having a block of memory cells, the block of memory cells having a plurality of pages; and
    at least one processor programmed with instructions that, when executed by the at least one processor, cause the at least one processor to:
        control a memory controller to perform a partial erase operation that partially erases each memory cell of the block of memory cells;
        control the memory controller to perform at least one read operation that reads the block of memory cells while the block of memory cells is in a partially-erased state from the partial erase operation;
        for each of the plurality of pages, determine a parameter indicative of a number of memory cells in an erase state;
        determine a pattern of the parameter across the plurality of pages;
        compare the pattern to predefined data indicative of at least one signature of the parameter for at least one manufacturing source; and
        identify a manufacturing source of the memory based on a comparison of the pattern to the predefined data.

2. The electronic device of claim 1, wherein the memory controller is configured to perform the partial erase operation by:
    transmitting an erase command to a memory chip having the block of memory cells for causing the memory chip to initiate an erase operation; and
    transmitting an interrupt signal to the memory chip for interrupting the erase operation before completion of the erase operation.

3. The electronic device of claim 1, wherein the parameter is an erase efficiency for the partial erase operation.

4. An electronic device, comprising:
    memory having a block of memory cells, the block of memory cells having a plurality of pages; and
    at least one processor programmed with instructions that, when executed by the at least one processor, cause the at least one processor to:
        control a memory controller to perform a memory operation on the block of memory cells;
        control the memory controller to perform at least one read operation that reads the block of memory cells while the block of memory cells is affected by the memory operation;
        for each of the pages, assess a performance of the memory operation by determining a parameter indicative of a number of memory cells in a particular state;
        determine a pattern of the parameter across the plurality of pages;
        compare the pattern to predefined data indicative of at least one signature of the parameter for at least one manufacturing source; and
        identify a manufacturing source of the memory based on a comparison of the pattern to the predefined data.

5. A method for authenticating memory, comprising:
    performing a partial program operation on a block of memory cells of the memory, the block of memory cells having a plurality of pages;
    performing at least one read operation on the block of memory cells while the block of memory cells is in a partially-erased state from the partial erase operation;
    for each of the plurality of pages, determining a parameter indicative of a number of memory cells in an erase state;
    determining a pattern of the parameter across the plurality of pages;
    comparing the pattern to predefined data indicative of at least one signature of the parameter for at least one manufacturing source; and
    identifying a manufacturing source of the memory based on the comparing.

6. The method of claim 5, wherein the performing the partial erase operation comprises:
    transmitting an erase command to a memory chip having the block of memory cells for causing the memory chip to initiate an erase operation; and
    transmitting an interrupt signal to the memory chip for interrupting the erase operation before completion of the erase operation.

7. The method of claim 5, wherein the parameter is an erase efficiency for the partial erase operation.

* * * * *